US012627933B2

(12) United States Patent
Zeltzer et al.

(10) Patent No.: US 12,627,933 B2
(45) Date of Patent: May 12, 2026

(54) SIMULTANEOUS DUAL USE OF AN ACOUSTIC DEVICE AS A LOUDSPEAKER AND MICROPHONE

(71) Applicant: Waves Audio Ltd., Tel Aviv (IL)

(72) Inventors: Gabriel Zeltzer, Lapid (IL); Meir Shaashua, Tel Aviv (IL)

(73) Assignee: Waves Audio Ltd., Tel Aviv (IL)

( * ) Notice: Subject to any disclaimer, the term of this patent is extended or adjusted under 35 U.S.C. 154(b) by 145 days.

(21) Appl. No.: 18/661,743

(22) PCT Filed: Nov. 9, 2022

(86) PCT No.: PCT/IL2022/051192
§ 371 (c)(1),
(2) Date: May 14, 2024

(87) PCT Pub. No.: WO2023/089607
PCT Pub. Date: May 25, 2023

(65) Prior Publication Data

US 2024/0305930 A1 Sep. 12, 2024

(30) Foreign Application Priority Data

Nov. 17, 2021 (GB) ..................................... 2116592

(51) Int. Cl.
*H04R 19/02* (2006.01)
*H04R 3/06* (2006.01)
(Continued)

(52) U.S. Cl.
CPC ............... *H04R 19/02* (2013.01); *H04R 3/06* (2013.01); *H04R 7/04* (2013.01); *H04R 19/04* (2013.01); *H04R 2400/01* (2013.01)

(58) Field of Classification Search
CPC . H04R 19/02; H04R 3/06; H04R 7/04; H04R 19/04; H04R 2400/01
(Continued)

(56) References Cited

U.S. PATENT DOCUMENTS 2,968,695 A 1/1961 Corliss et al.
3,668,335 A 6/1972 Beveridge
(Continued)

FOREIGN PATENT DOCUMENTS

GB 1178898 12/1967
GB 2595234 A * 11/2021 ........... H04R 29/001
(Continued)

OTHER PUBLICATIONS

Wittmann S, Glacer C, Wagner S, Pindl S, Lemme MC. Graphene membranes for Hall sensors and microphones integrated with CMOS-compatible processes. ACS Applied Nano Materials. Jul. 18, 2019;2(8):5079-85.
(Continued)

*Primary Examiner* — Paul Kim
(74) *Attorney, Agent, or Firm* — Dr. Hanan Farber Patent Agent Ltd.

(57) ABSTRACT

Operating an electrostatic acoustic device simultaneously as a speaker and as a microphone. The electrostatic acoustic device includes a membrane and an electrode disposed proximate to the membrane. An input varying audio signal is input to the electrostatic acoustic device. The membrane is configured to respond mechanically to a varying electric field responsive to the varying audio signal input. A portion of the input varying audio signal is tapped to produce a reference signal. A signal is detected responsive to motion of the membrane, to convert the signal to an output varying voltage signal. The output varying voltage signal is compared to the reference signal to produce a microphone signal.
(Continued)

The microphone signal is responsive to motion of the membrane induced by air pressure variations of ambient sound.

20 Claims, 4 Drawing Sheets

(51) Int. Cl.
*H04R 7/04* (2006.01)
*H04R 19/04* (2006.01)

(58) Field of Classification Search
USPC ............................................................ 381/98
See application file for complete search history.

(56) References Cited

U.S. PATENT DOCUMENTS

| | | | | |
|---|---|---|---|---|
| 3,773,976 | A | 11/1973 | Beveridge | |
| 9,167,337 | B2 | 10/2015 | Haebora | |
| 10,678,502 | B2 | 6/2020 | Sheynblat | |
| 2005/0281419 | A1 | 12/2005 | Miyazaki | |
| 2006/0072770 | A1* | 4/2006 | Miyazaki | H04R 19/02 381/116 |
| 2007/0124620 | A1 | 5/2007 | Miyazaki | |
| 2014/0241536 | A1 | 8/2014 | Adams | |
| 2014/0270271 | A1 | 9/2014 | Dehe et al. | |
| 2018/0199125 | A1 | 7/2018 | Gabai | |
| 2020/0105243 | A1* | 4/2020 | Jorritsma | H03F 3/181 |

FOREIGN PATENT DOCUMENTS

| | | | |
|---|---|---|---|
| GB | 2595234 | B | 6/2022 |
| GB | 2602775 | B | 2/2023 |
| JP | 6274497 | B2 | 2/2018 |

OTHER PUBLICATIONS

Ravaud R, Lemarquand G, Roussel T, Lemarquand V. Ranking of the nonlinearities of electrodynamic loudspeakers. Archives of Acoustics. Jan. 1, 2010;35(1):49-66.

* cited by examiner

50

SIMULTANEOUS DUAL USE OF AN ACOUSTIC DEVICE AS A LOUDSPEAKER AND MICROPHONE

BACKGROUND

1. Technical Field

The present invention relates to electrostatic audio devices, including earphones and loudspeakers.

2. Description of Related Art

In the art of high fidelity sound reproduction, the electrostatic loudspeaker has received attention because of inherent excellent sound quality and smooth response over wide frequency ranges. In such devices, a flexible sound producing membrane is positioned near an electrode, or in the case of a push-pull arrangement, a pair of electrodes, one on either side of the membrane. A polarization potential is applied between the membrane and the electrodes, and an audio signal is superimposed on the electrodes, causing the membrane to move in response to the audio signal. Electrodes are acoustically transmissive so that sound produced by the moving membrane radiates outward through the electrode to the listening area.

Electrostatic devices are highly efficient both electrically and mechanically. Electrical impedance is high and decreases with increasing acoustic frequency. High electrical impedance results in very low operating currents and minimal electrical losses. Mechanically, there are no moving parts other than the moving membrane which is very light in weight. Electrostatic devices are therefore inherently more energy efficient than electrodynamic acoustic devices currently used in battery operated electronic devices.

BRIEF SUMMARY

Various methods and drivers are disclosed herein for configuring an electrostatic acoustic device to operate simultaneously as a speaker and as a microphone. The electrostatic acoustic device includes a membrane and an electrode disposed proximate to the membrane. An input varying audio signal is input to the electrostatic acoustic device. The membrane is configured to respond mechanically to a varying electric field responsive to the varying audio signal input. A portion of the input varying audio signal is tapped to produce a reference signal. A signal is detected responsive to motion of the membrane, to convert the signal to an output varying voltage signal. The output varying voltage signal is compared to the reference signal to produce a microphone signal. The microphone signal is responsive to motion of the membrane induced by air pressure variations of ambient sound. The input varying audio signal may be input to the membrane and the electrodes may connect to a high voltage dual DC bias symmetric or asymmetric source. Alternatively, the input varying audio signal may be input to the electrode and the membrane may be connected to a high voltage DC bias. The electrode may include a first electrode disposed on a first side of the membrane and a second electrode disposed on a second side of the membrane opposite the first side. The input varying audio signal may include an inverted varying audio signal input to the first electrode and a non-inverted varying audio signal input to the second electrode. The reference signal may be responsive to the inverted varying audio signal input and the non-inverted varying audio signal input. A probe signal varying at radio frequency may be injected into an input of the electrostatic acoustic device. The detection may be performed by converting a current or charge signal output to a modulated voltage signal. The current or charge signal may include an audio signal varying at audio frequencies modulating the radio frequency of the probe signal. The modulated voltage signal may be demodulated to produce the output varying voltage signal varying at audio frequency. The output varying voltage signal varying at audio frequency may be obtained by homodyne detection of the modulated voltage signal at radio frequency. The homodyne detection of the modulated radio frequency carrier signal may be achieved via a lock-in amplifier detector having the output low pass filter bandwidth higher than the audio frequency range of interest. The modulated voltage signal at radio frequency may be phase and frequency locked and a radio frequency carrier signal responsive to the probe signal may vary at radio frequency. An oscillator signal may be generated synchronous with a radio frequency carrier of the modulated voltage signal. The probe signal may be output responsive to the synchronous oscillator signal. The demodulation of the modulated voltage signal may be performed by low pass filtering or by rectifying prior to low pass filtering.

BRIEF DESCRIPTION OF THE DRAWINGS

The invention is herein described, by way of example only, with reference to the accompanying drawings, wherein.

Figure 1:
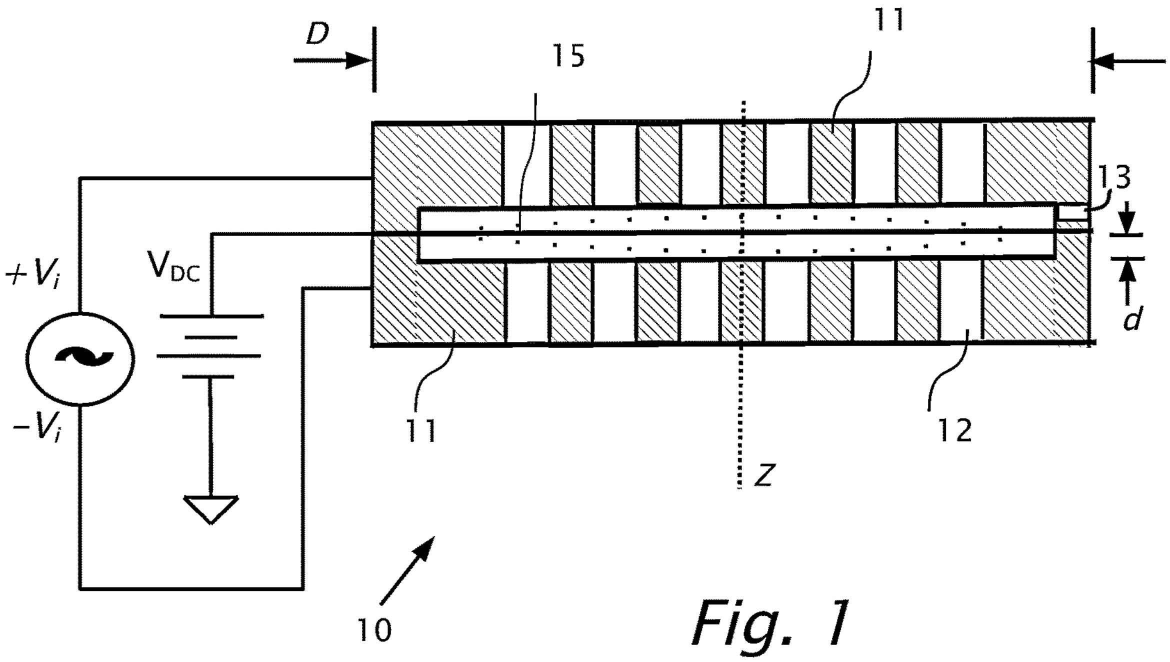
FIG. 1 illustrates schematically a cross-sectional view of an electrostatic device, according to features of the present invention.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to like elements throughout. The features are described below to explain the present invention by referring to the figures.

By way of introduction, different aspects of the present invention may be directed to a circuit for in-ear and/or over-ear electrostatic acoustic device which may be used simultaneously as a headphone and microphone. Circuits may be designed for an electrostatic speaker of maximum dimension, e.g. diameter D of 50 millimetres or less, or in some embodiments an electrostatic speaker of dimension D of 25 millimetres or less, or in yet other embodiments an electrostatic speaker of dimension D of 10 millimetres or less. For an earphone application, an electrostatic speaker may have maximum dimension, e.g. diameter D of 5 millimetres or less.

Thus, in embodiments of the present invention including electrostatic acoustic device 10 being used as an earphone and sealed into the ear canal, the mechanical displacement of the ear drum may become coupled with the mechanical displacement of membrane 15. Voice of a user may be transmitted internally by bone conduction to the ear drum and by the internal coupling to membrane 15 enabling membrane 15 for use as a microphone.

Referring now to the drawings, reference is now made to FIG. 1, which illustrates schematically an electrostatic acoustic device 10, according to features of the present invention. Vertical axis Z is shown through a centre of acoustic device 10. A tensioned membrane 15 is supported, by edges of electrodes 11, essentially in a plane perpendicular to vertical axis Z. Membrane 15 may be impregnated with a conductive, resistive and/or electrostatic material so that membrane 15 responds mechanically to a changing electric field. The central regions of electrodes 11 are mounted proximate to, e.g. in parallel to, membrane 15, nominally equidistant, at a distance d, e.g. 20-500 micrometres from membrane 15. Electrodes 11 as illustrated may be perforated with apertures 12 transmissive to sound waves emanating from membrane 15 when electrostatic acoustic device 10 is operating. Alternatively or in addition one or more side ports 13 may pass sound waves from air surrounding membrane 15 to outside device 10.

During operation of electrostatic acoustic device 10, a constant direct current (DC) bias voltage, e.g. $+V_{DC}$+100 to +1000 volts, may be applied using a conductive contact to membrane 15. Audio input voltage signals $\pm V_i$ may be applied to electrodes 11. Alternatively, voltage signal $V_i$ may be applied to membrane 15 and electrodes 11 may be biased at $\pm V_{DC}$. Voltage signals $\pm V_i$ may vary at audio frequencies, nominally between 20-20,000 Hertz. A non-inverted voltage signal $+V_i$ may be applied to one of electrodes 11 and an identical but inverted voltage signal $-V_i$ may be applied to the other electrode 11. Dotted lines illustrate schematically membrane 15 moving in response to a changing electric voltage due to voltage signals $\pm V_i$.

Figure 2:
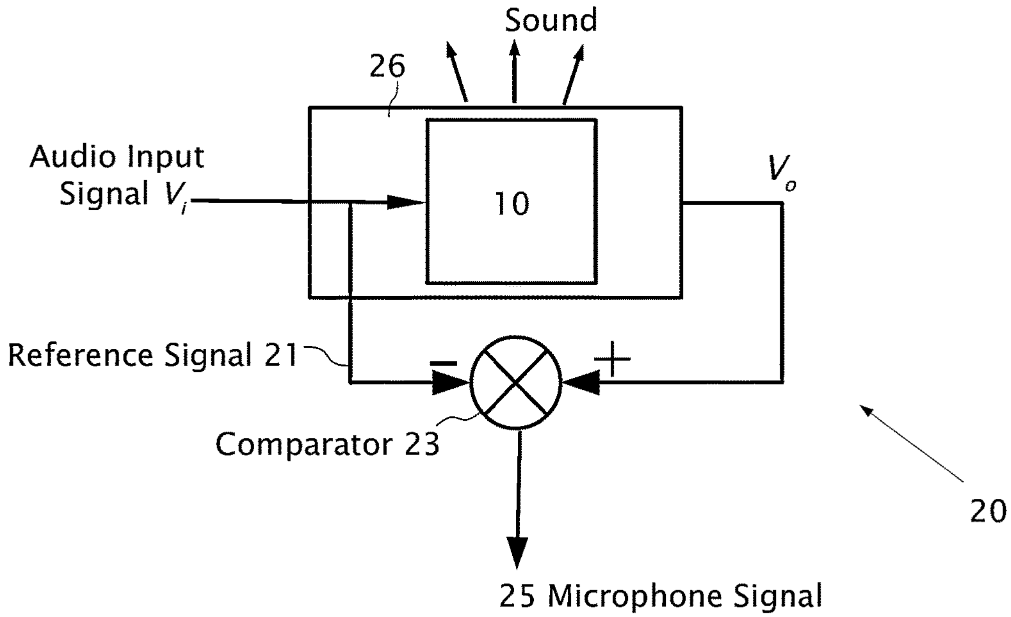
FIG. 2 is a system diagram including an electrostatic acoustic device and driver thereof for dual use as a loudspeaker and a microphone.
Figure 5:
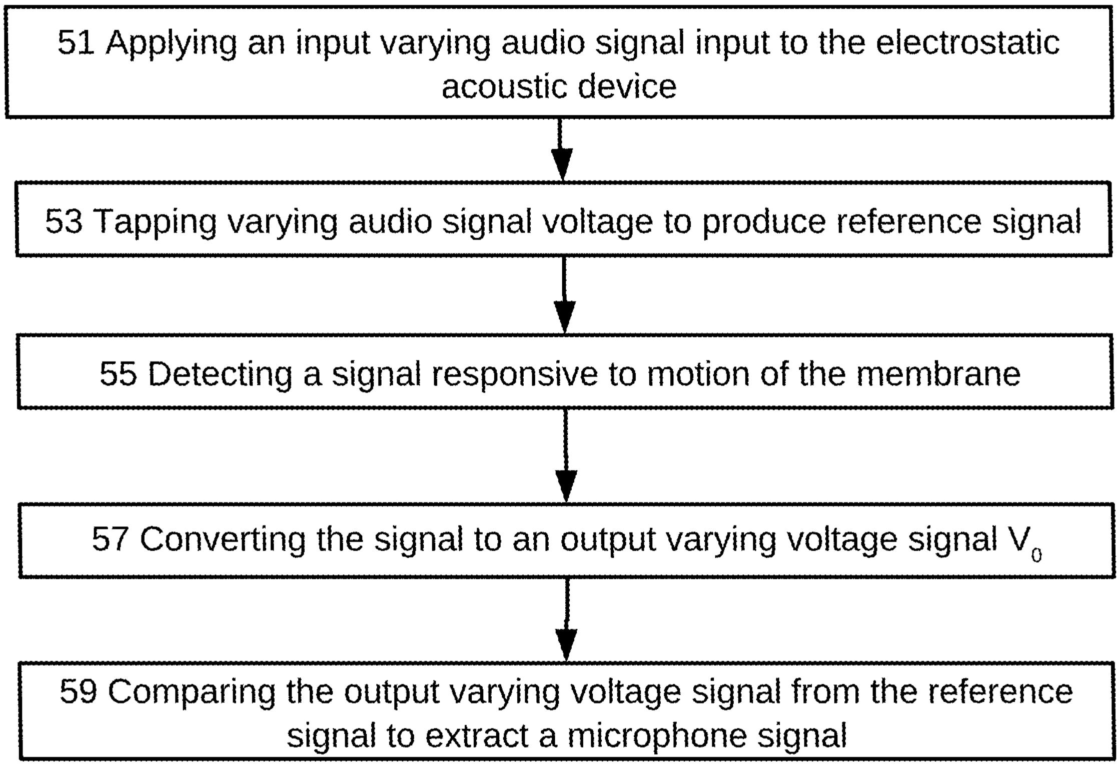
FIG. 5 is a flow diagram of a method, illustrating features of the present invention.

Reference is now also made to FIG. 2, a simplified electronic system block diagram 20 including electrostatic acoustic device 10, and FIG. 5, a flow diagram 50 of a method according to features of the present invention, for simultaneous dual operation as a speaker and as a microphone. Block 26 represents a driver or electronic circuitry which inputs (step 51) voltage signal I', to drive electrostatic acoustic device 10 causing sound to emanate from moving membrane 15. A reference signal 21 is split or tapped (step 53) from input audio signal I', and input to a comparator 23. Block 26 detects (step 55) a signal proportional to or responsive to mechanical motion of membrane 15 and outputs a signal, e.g. voltage $V_o$, responsive to membrane 15 motion (step 57). Voltage output signal $V_o$ is a second input to comparator 23. Comparator 23 is configured to compare, e.g. subtract, reference signal 21 from output voltage signal $V_o$ which with appropriate signal processing, may extract a microphone signal 25 responsive to vibrations of membrane 15 caused by an external acoustic pressure.

Detection (step 55) of a signal proportional to or responsive to mechanical motion of membrane 15 may be performed by various detection methods known in the art. Detection of a change in electrostatic current or change in capacitance between membrane 15 and electrodes 11 is further described hereinafter in reference to FIGS. 3-7. Other detection (step 55) methods for measuring membrane 15 motion may be used, according to different embodiments of the present invention including optical sensors, external field gradient (force) detection such as electrostatic or magnetic field gradient using a Hall effect magnetic sensor by way of example.

For any detection method (step 55) responsive to membrane 15 motion, a microphone signal may be extracted (step 59). Subtraction may be performed in the time domain by digital signal processing with an appropriate level adjustment and/or time delay. Alternatively, subtraction may be performed in the frequency domain by transforming the signals, e.g. short time Fourier transform, performing the subtraction in the frequency domain and performing an inverse Fourier transform back to the time domain to extract a microphone signal (step 59).

Figure 3A:
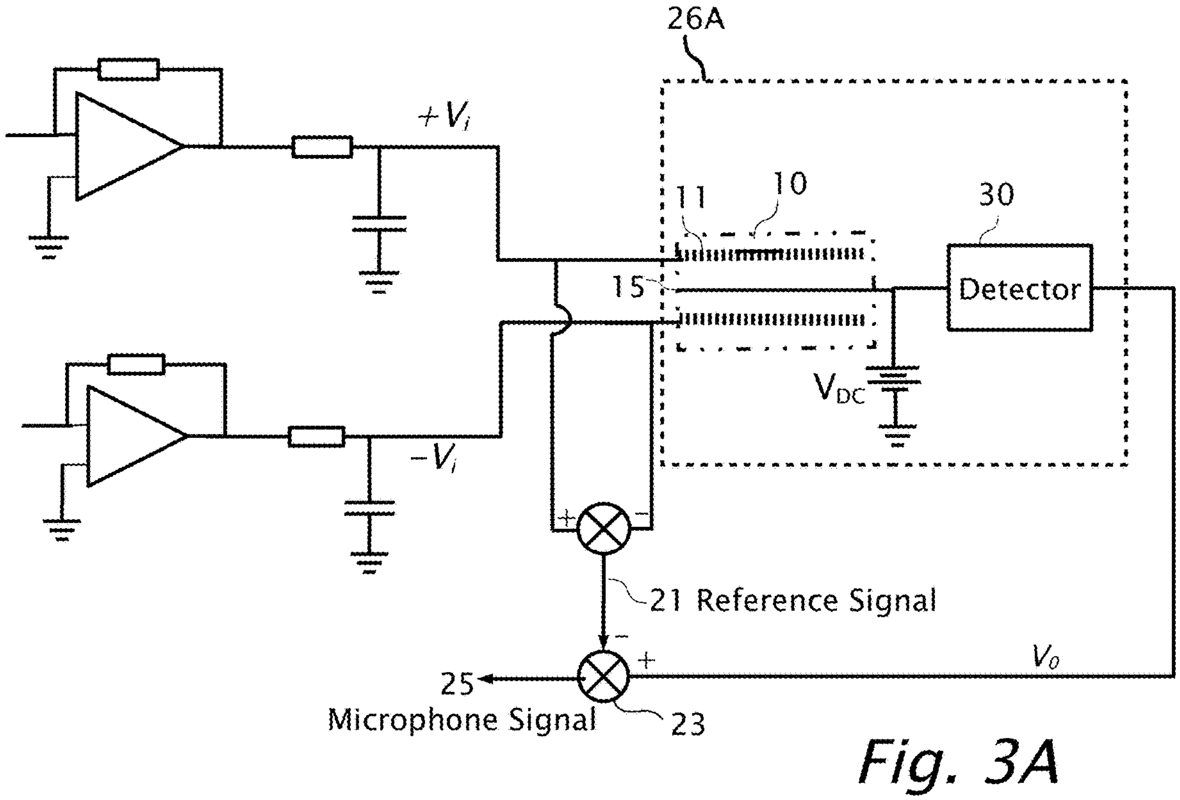
FIG. 3A illustrates an electronic block diagram of electrostatic acoustic device and driver thereof.

Reference is now made to FIG. 3A, which illustrates schematically a circuit 26A, an alternative for system 26 in FIG. 2, in further detail, according to features of the present invention. Driver 26A includes electrostatic acoustic device 10 which may be configured to receive a high voltage audio input $+V_i$ at first electrode 11 and an inverted high voltage audio input-Wat second electrode 11 varying at audio frequencies intended for transduction into sound by electrostatic acoustic device 10. In addition, membrane 15 may respond mechanically as device 10 may behave as a microphone to ambient sound waves.

In response to ambient sound, distance d (FIG. 1) between membrane 15 and electrodes 11 changes resulting in a change of capacitance (' of electrostatic acoustic device 10. A changing current i(t) due to ambient sound may be sensed using a detector 30 which may be include a transimpedance amplifier. The changing current i(t) may be approximated:

$$i(t) = V_{DC}\frac{dC}{dt} \quad (2)$$

A reference signal 21 is split or tapped (step 53) from one or more input audio signals $\pm V_i$ and input to a comparator 23. Voltage output signal $V_o$ is a second input to comparator 23. Comparator 23 is configured to compare reference signal 21 to output voltage signal $V_o$, e.g. subtract reference signal 21 from output voltage signal $V_o$ or otherwise extract a microphone signal 25 responsive to sound inducing vibrations of membrane 10.

Figure 3B:
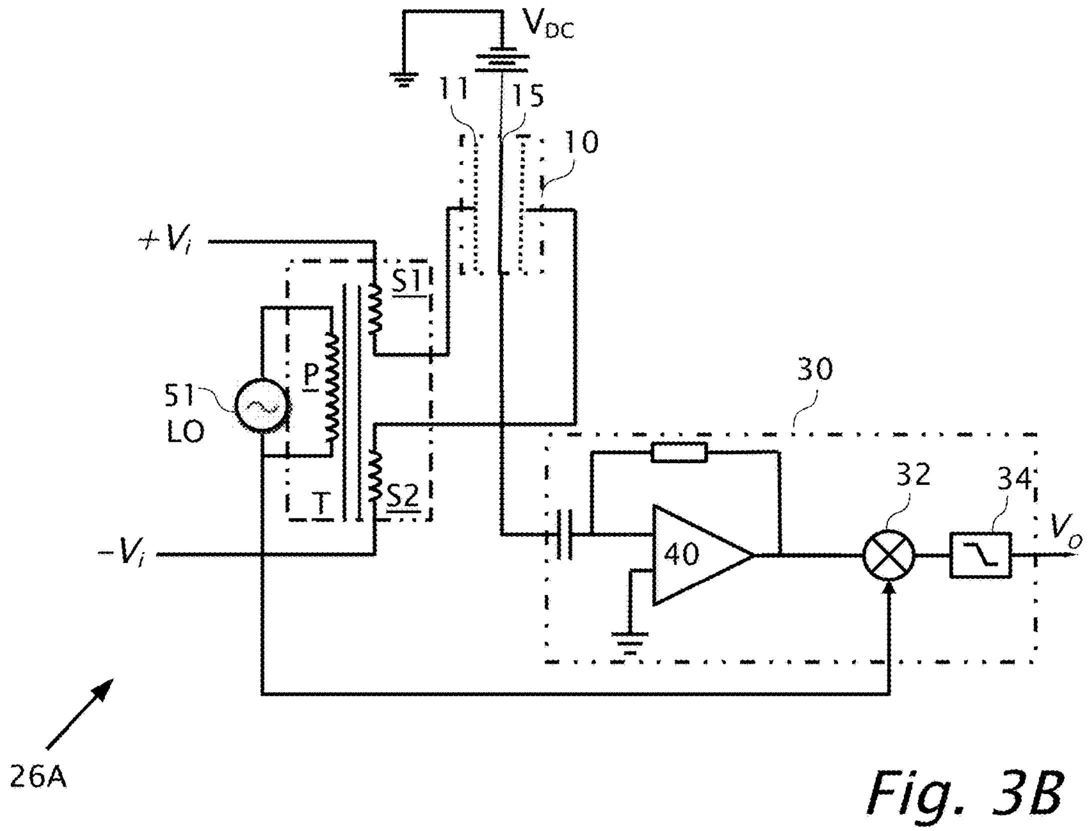
FIG. 3B illustrates further details of the embodiment of the present invention shown in FIG. 3A.

Reference is now made to FIG. 3B, which illustrates schematically further detail in driver 26A of FIG. 3A, according to features of the present invention. A probe signal from a local oscillator (LO) 51 at radio frequency, e.g. 0.1-2 megahertz may be coupled between the primary windings P of a transformer T. Audio signal $+V_i$ and inverted audio signal $-V_i$ may be fed respectively to electrodes 11 through series connected secondary windings S1 and S2 of transformer T. Audio signals $\pm V_i$ may be high voltage signals. Alternatively, audio signals $\pm V_i$ may be low voltage signals up to ~±20V with direct current high voltage applied to membrane 15 as shown in device 10 (FIG. 1). The probe signal produces a current which has a magnitude determined by the characteristic reactance of the electric circuit formed by the membrane 15 and electrode 11, essentially a variable capacitor. An advantage of using radio frequency is in the fact that radio frequency doesn't produce a perceptible mechanical motion but is modulated by the electrical change in capacitance which is related to the mechanical motion produced when an audio signal is present. In addition, the radio frequency amplitude modulated signal has a higher SNR with respect to the total capacitance change of the device when the compared to the current induced by the direct capacitance change shown in relation (2).

A changing current i(t) due to ambient sound is now shown using a trans-impedance amplifier 40. Probe signal from local oscillator (LO) 51 may be combined with the voltage output of amplifier 40 at signal combiner/multiplier 32. Amplifier 40 may be configured to be inverting or non-inverting, centred out-of-band for audio frequencies, between 0.1-2 megahertz including the radio frequency of LO 51, and preferably far from any resonances of membrane 15. Signal combiner/multiplier 32 outputs to a low pass filter 34 which demodulates and transmits voltage output signal $V_o$, varying at audio frequencies. System 26A is a homodyne detection circuit which uses local oscillator 51 as a reference which is multiplied with the measured signal output of amplifier 40 at the same frequency. The base band or DC component of this multiplication includes the signal which is frequency converted from a narrow band around LO 52 frequency detected with a very high signal to noise ratio. Multiplier 32 may be implemented with analogue circuit AD835 from Analog Devices Inc (Norwood, MA, USA), by way of example.

Alternatively, a charge amplifier may be considered, instead of a transimpedance amplifier 40, which integrates current i(t) to sense charge Q(t) which varies with changing capacitance of electrostatic acoustic device 10, and the sensed charge is converted to an output voltage signal $V_o$. Amplifier 40 may be configured to be inverting or non-inverting, and may have a band-pass including audio frequencies, 20-20000 Hertz.

Figure 4A:
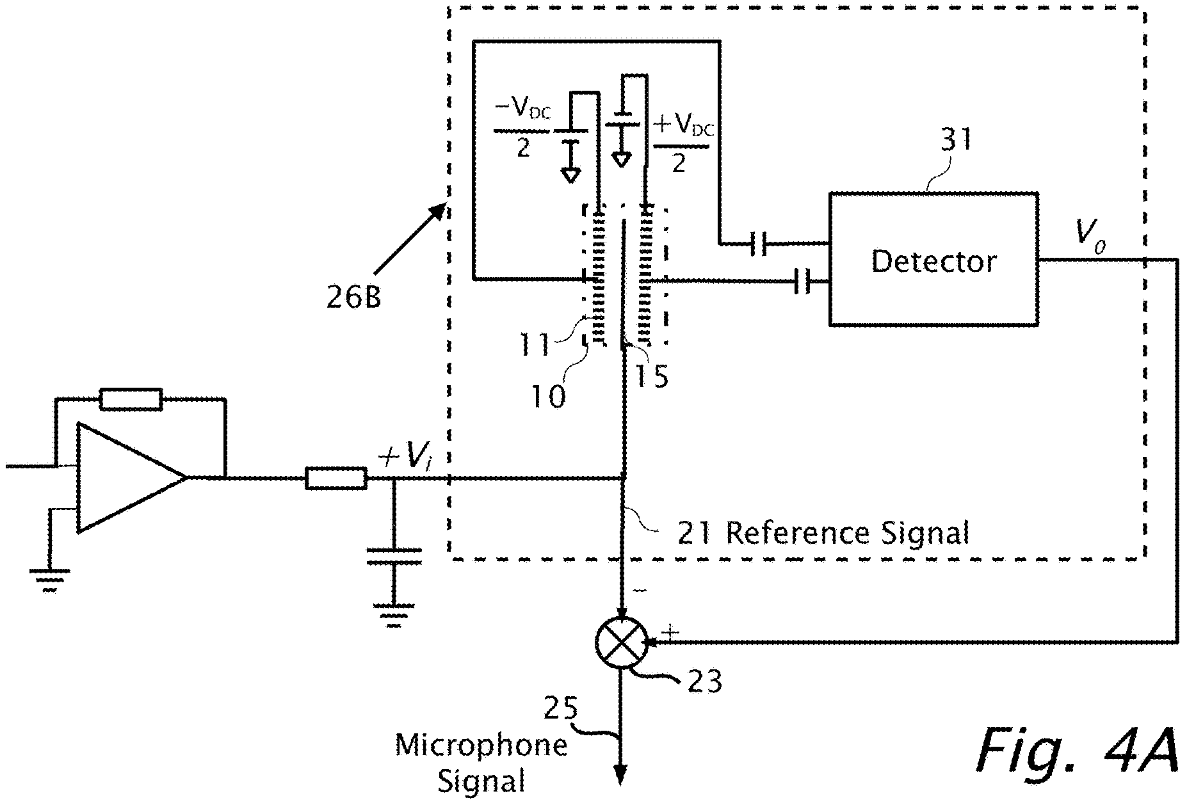
FIG. 4A illustrates schematically an alternative driver of the electrostatic acoustic device, according to features of the present invention.

Reference is now also made to FIG. 4A, which illustrates schematically another alternative 26B for block 26 in FIG. 2, according to features of the present invention. In driver 26B, audio voltage $V_i$ may be applied to membrane 15. Bias voltage $V_{DC}$ is symmetrically applied on electrodes 11 with $-V_{DC}/2$ on a first electrode 11 and $+V_{DC}/2$ applied on a second electrode 11. A detector 31 may be used with inputs capacitively coupled respectively to electrodes 11. The voltage output $V_o$ of detector 31 may vary with capacitance of device 10. A reference signal 21 is split or tapped (step 53) from input audio signal I' and input to a comparator 23. Voltage output signal $V_o$ is a second input to comparator 23. Comparator 23 is configured to compare reference signal 21 to output voltage signal $V_o$, e.g. subtract reference signal 21 from output voltage signal $V_o$ or otherwise extract a microphone signal 25 responsive to sound inducing vibrations of membrane 10.

Figure 4B:
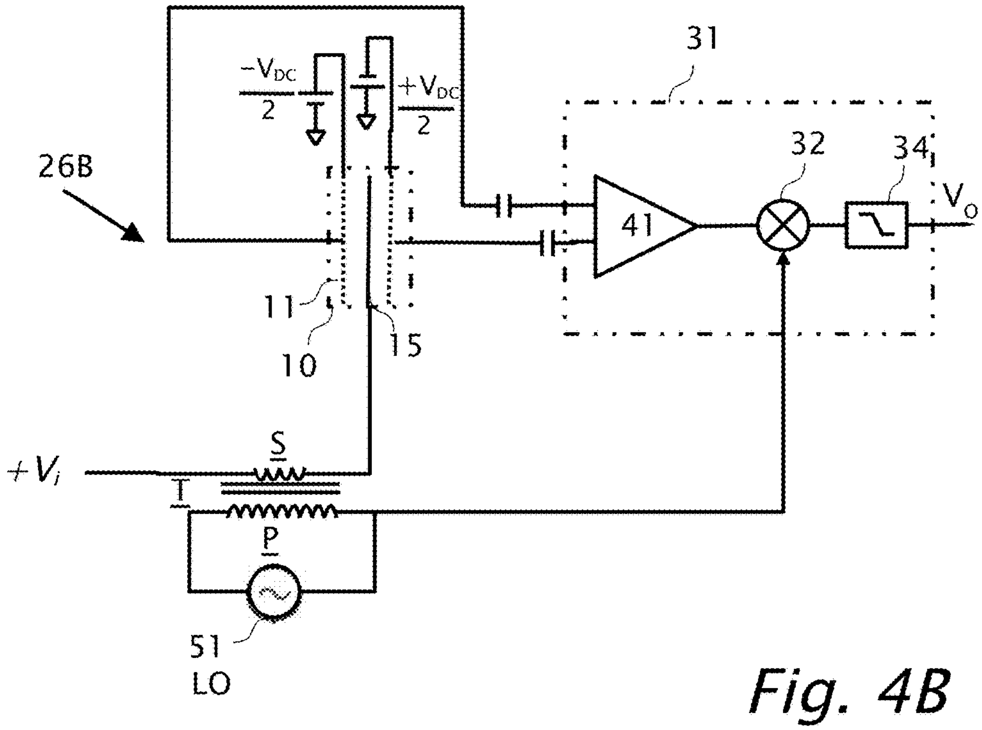
FIG. 4B illustrates further details of the embodiment of the present invention shown in FIG. 3A.

Reference is now made to FIG. 4B, which illustrates further detail for driver 26B as an alternative for block 26 in FIG. 2, according to features of the present invention. In driver 26B, audio voltage $V_i$ may be applied to membrane 15. A probe signal from a local oscillator 51 may be induced onto membrane 15 using a transformer T with primary P connected in parallel with local oscillator 51 and secondary S connected in series between audio voltage $V_i$ and membrane 15. Another method of injecting the probe signal onto the membrane may use capacitive coupling via dedicated high voltage ceramic capacitors. A differential amplifier 41 may be used with inputs capacitively coupled respectively to electrodes 11. The voltage output of differential amplifier 41 varies with capacitance of device 10. Probe signal from local oscillator (LO) 51 may also be combined with the voltage output of differential amplifier 41 at signal combiner/multiplier 32. Signal combiner/multiplier 32 outputs to a low pass filter 34 which demodulates and transmits voltage output signal $V_o$, varying at audio frequencies. Differential amplifier 41 may be implemented using Texas Instruments/Burr-Brown™ INA105. According to features of the present invention driver 26B has an advantage over driver 26A because, one and not two high voltage input amplifiers may be used.

Still referring to FIGS. 4A and 4B, alternative embodiments of the present invention may be configured, with replacement of transformer T with a capacitive coupling of audio voltages $\pm V_i$ to electrodes 11.

The term "homodyne" as used herein refers to a method of detection/demodulation of a signal which is phase and/or frequency modulated onto an oscillating signal by combining with a reference oscillation.

The term "ambient" as used herein refers to vicinity of the membrane of the electrostatic acoustic device.

The term "driver" as used herein is an electronic circuit configured to electrically bias, input and/or output signals from an electrostatic acoustic device.

The term "phase sensitive detector circuit" as used herein is an electronic circuit including essentially a multiplier (or mixer) and a loop filter that produces a direct-current output signal that is proportional to the product of the amplitudes of two alternating-current input signals of the same frequency and to the cosine of the phase between them.

The term "transimpedance amplifier" as used herein converts current to voltage. Transimpedance amplifiers may be used to process current output of a sensor to a voltage signal output.

The term "charge amplifier" as used herein converts a time varying charge to a voltage output typically by integrated a time varying current signal.

The term "audio" or "audio frequency" refers to an oscillation rate of an alternating electric current or voltage or of a magnetic, electric or electromagnetic field or mechanical system in the frequency range 0-20,000 Hertz The term "audio signal", "audio output", "audio output signal" as used herein refer to an electrical signal varying essentially at audio frequency.

The term "radio frequency" (RF) is the oscillation rate of an alternating electric current or voltage or of a magnetic, electric or electromagnetic field or mechanical system in the frequency range from around twenty thousand times per second (20 kHz) to around three hundred billion times per second (300 GHz).

The transitional term "comprising" as used herein is synonymous with "including", and is inclusive or open-ended and does not exclude additional element or method steps not explicitly recited. The articles "a", "an" is used herein, such as "a circuit" or "an electrode" have the meaning of "one or more" that is "one or more circuits", "one or more electrodes".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another. Although selected features of the present invention have been shown and described, it is to be understood the present invention is not limited to the described features.

The invention claimed is:

1. A method comprising:

configuring an electrostatic acoustic device to operate simultaneously as a speaker and as a microphone, wherein the electrostatic acoustic device includes a membrane and an electrode disposed proximate to the membrane, by enabling:

applying an input varying audio signal input to the electrostatic acoustic device, wherein the membrane is configured to respond mechanically to a varying electric field responsive to the varying audio signal input;

tapping a portion of the input varying audio signal to produce a reference signal;

detecting motion of the membrane thereby receiving a signal responsive to the motion of the membrane, and converting the signal to an output varying voltage signal; and comparing the output varying voltage signal to the reference signal to produce a microphone signal, wherein the microphone signal is responsive to motion of the membrane induced by air pressure variations of ambient sound.

2. The method of claim 1, further comprising:

inputting the input varying audio signal to the membrane; and connecting the electrode to a high voltage DC bias.

3. The method of claim 1, further comprising:

inputting the input varying audio signal to the electrode; and connecting the membrane to a high voltage DC bias.

4. The method of claim 1, wherein the electrode includes a first electrode disposed on a first side of the membrane and a second electrode disposed on a second side of the membrane opposite the first side, wherein the input varying audio signal includes an inverted varying audio signal input to the first electrode and a non-inverted varying audio signal input to the second electrode and wherein the reference signal is responsive to the inverted varying audio signal input and the non-inverted varying audio signal input.

5. The method of claim 1, further comprising:

injecting a probe signal varying at radio frequency into an input of the electrostatic acoustic device;

said detecting by converting a current or charge signal output to a modulated voltage signal, wherein the current or charge signal includes an audio signal varying at audio frequencies modulating the radio frequency of the probe signal;

demodulating the modulated voltage signal to produce the output varying voltage signal varying at audio frequency.

6. The method of claim 5, wherein the output varying voltage signal varying at audio frequency is obtained by homodyne detection of the modulated voltage signal at radio frequency.

7. The method of claim 5, further comprising:

phase and frequency locking the modulated voltage signal at radio frequency and a radio frequency carrier signal responsive to the probe signal varying at radio frequency.

8. The method of claim 5 further comprising:

generating an oscillator signal synchronous with a radio frequency carrier of the modulated voltage signal;

outputting the probe signal responsive to the synchronous oscillator signal.

9. The method of claim 5, wherein said demodulating the modulated voltage signal is performed by low pass filtering.

10. The method of claim 5, further comprising performing said demodulating by rectifying prior to low pass filtering.

11. A driver of an electrostatic acoustic device including a membrane and an electrode disposed proximate to the membrane, the driver configured to:

operate the electrostatic acoustic device simultaneously as a speaker and as a microphone by:

applying an input varying audio signal input to the electrostatic acoustic device, wherein the membrane is configured to respond mechanically to a varying electric field responsive to the varying audio signal input;

tapping a portion of the input varying audio signal to produce a reference signal;

detecting motion of the membrane thereby receiving a signal responsive to the motion of the membrane, and converting the signal to an output varying voltage signal; and comparing the output varying voltage signal to the reference signal to produce a microphone signal, wherein the microphone signal is responsive to motion of the membrane induced by air pressure variations of ambient sound.

12. The driver of claim 11, further configured to:

input the input varying audio signal to the membrane; and connect the electrode to a high voltage DC bias.

13. The driver of claim 11, further configured to:

input the input varying audio signal to the electrode; and connect the membrane to a high voltage DC bias.

14. The driver of claim 11, wherein the electrostatic acoustic device includes a first electrode disposed on a first side of the membrane and a second electrode disposed on a second side of the membrane opposite the first side, the driver configured to:

input an inverted varying audio signal to the first electrode and a non-inverted varying audio signal input to the second electrode and wherein the reference signal is responsive to the inverted varying audio signal input and the non-inverted varying audio signal input.

15. The driver of claim 11, further configured to:

inject a probe signal varying at radio frequency into an input of the electrostatic acoustic device;

convert a current or charge signal output from the electrostatic acoustic device to a modulated voltage signal, wherein the current or charge signal includes an audio signal varying at audio frequencies modulating the radio frequency of the probe signal; and demodulate the modulated voltage signal to produce the output varying voltage signal varying at audio frequency.

16. The driver of claim 15, further configured to obtain the output varying voltage signal varying at audio frequency by homodyne detection of the modulated voltage signal at radio frequency.

17. The driver of claim 15, further configured to:

phase and frequency lock the modulated voltage signal at radio frequency and a radio frequency carrier signal responsive to the probe signal at radio frequency.

18. The driver of claim 15, further configured to:

generate an oscillator signal synchronous with a radio frequency carrier of the modulated voltage signal;

outputting the probe signal responsive to the synchronous oscillator signal.

19. The driver of claim 15, further comprising a low-pass filter to demodulating the modulated voltage signal.

20. The driver of claim 15 further comprising a rectifier configured to demodulate by rectifying prior to low pass filtering.

* * * * *